3,190,887
POLYCARBOCYCLICMETHYLMERCAPTO-
IMIDAZOLINES
William H. Hensley, Raleigh, N.C., Dewayne C. Torgeson, Dobbs Ferry, N.Y., and Joseph A. Lambrech, deceased, late of Charleston, W. Va., by Vallah G. Lambrech, executrix, Charleston, W. Va., assignors to Union Carbide Corporation, a corporation of New York
No Drawing. Filed Aug. 31, 1961, Ser. No. 135,379
15 Claims. (Cl. 260—309.6)

The present invention relates to 2-(polycarbocyclicmethylmercapto)imidazolines, their acid salt derivatives and to the preparation thereof. More specifically, the present invention relates to 2-(polycarbocyclicmethylmercapto)imidazolines and their acid salts, which possess high biological activity and are particularly useful as fungicides.

In the field of agriculture, plant fungi represent a serious problem to the growers of fruits and vegetables as these fungi attack and damage a wide variety of plants. Of the many such fungi, one family which is particularly troublesome is the powdery mildew as the powdery mildew grows and multiples only on living plants, as for example, tobacco plants, apple trees, cherry trees and the like.

The first visible symptom of powdery mildew is a gray to white felt-like growth on the leaves of the plants usually on their underside. As the disease progresses due to the spread of the fungi, the leaves curl and fold and eventually the entire leaf clusters and terminals of the plant are attacked by the fungi. The powdery mildew fungi, which so progresses, produces root-like mycelia called haustoria which are absorbing organs which penetrate the cells of the plants and withdraw food therefrom. Any healthy plant, thus forced to feed the fungi suffers a reduction in actively functioning leaf area and partial or complete destruction of leaves and stems.

Attempts to protect living plants against the powdery mildew fungi through the use of currently known fungicides have not been successful. Currently known fungicides are either ineffective against powdery mildew fungi or if effective, generally damage the plant to which they have been applied.

The present invention provides compounds which, when applied to plants such as those previously described, will effectively protect such plants against the damaging effects of powdery mildew fungi, killing substantially all fungi already present and substantially preventing any new fungi development thereon. The compounds of this invention are particularly desirable for use as fungicides as they effectively protect plants against powdery mildew fungi without damaging the plants in any manner. Furthermore, the compounds of this invention, being solids and being soluble in various liquids can be easily applied to the desired plants either by dusting techniques or as a liquid spray.

The 2-(polycarbocyclicmethylmercapto)imidazolines of this invention have the following structural formula:

(I)
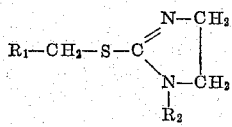

Salts of the 2-(polycarbocyclicmethylmercapto)imidazolines have the following structural formula:

(II)
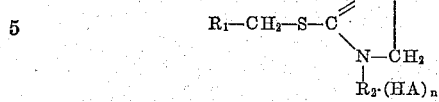

In structural Formulas I and II, $R_1$ is a fused polycarbocyclic group or radical containing from two to four rings inclusive, wherein each ring in the system contains from four to seven carbon atoms inclusive and preferably from five to six carbon atoms inclusive, counting common atoms as members of each ring, and wherein at least one ring of the system is a benzene ring.

Illustrative of such fused polycarbocyclic groups are unsubstituted fused polycarbocyclic groups, such as indenyl, indanyl, naphthyl, fluorenyl, phenalenyl, phenanthrenyl, acenaphthenyl, triphenylenyl, pyrenyl, anthryl, fluoranthenyl, naphthacenyl, chrysenyl, and the like; the hydroxy substituted fused polycarbocyclic groups such as hydroxyindenyl, hydroxyindanyl, hydroxynaphthyl, hydroxyfluorenyl, hydroxyphenalenyl, hydroxyphenanthrenyl, hydroxyacenaphthenyl, hydroxytriphenylenyl, hydroxypyrenyl, hydroxyanthryl, hydroxyfluoranthenyl, hydroxynaphthacenyl, and hydroxychrysenyl, and the like; the dihydroxy substituted fused polycarbocyclic groups or fused polycyclic hydrocarbyl groups such as dihydroxyindanyl, dihydroxyindenyl, dihydroxynaphthyl, dihydroxyfluorenyl, dihydroxyphenalenyl, dihydroxyphenanthrenyl, dihydroxyacenaphthenyl, dihydroxytriphenylenyl, dihydroxypyrenyl, dihydroxyanthryl, dihydroxyfluoranthenyl, dihydroxynaphthacenyl, dihydroxychrysenyl, and the like; the halo substituted fused polycarbocyclic groups such as iodoindanyl, bromoindanyl, chloroindanyl, fluoroindanyl, iodoindenyl, bromoindenyl, chloroindenyl, fluoroindenyl, iodonaphthyl, bromonaphthyl, chloronaphthyl, fluoronaphthyl, iodofluoroenyl, bromofluorenyl, chlorofluorenyl, fluorofluorenyl, iodophenalenyl, bromophenalenyl, chlorophenalenyl, fluorophenalenyl, iodophenanthrenyl, bromophenanthrenyl, chlorophenanthrenyl fluorophenanthrenyl, iodoacenaphthenyl, bromoacenaphthenyl, chloroacenaphthenyl, fluoroacenaphthenyl, iodotriphenylenyl, bromotriphenylenyl, chlorotriphenylenyl, fluorotriphenylenyl, iodopyrenyl, bromopyrenyl, chloropyrenyl, fluoropyrenyl, iodoanthryl, bromoanthryl, chloroanthryl, fluoroanthryl, iodofluoranthenyl, bromofluoranthenyl, chlorofluoranthenyl, fluorofluoranthenyl, iodonaphthacenyl, bromonaphthacenyl, chloronaphthacenyl, fluoronaphthacenyl, iodochrysenyl, bromochrysenyl, chlorochrysenyl, fluorochrysenyl and the like; and the methyl substituted fused polycarbocyclic groups such as methylindanyl, methylindenyl, methylnaphthyl, methylfluorenyl, methylphenalenyl, methylphenanthrenyl, methylacenaphthenyl, methyltriphenylenyl, methylpyrenyl, methylanthryl, methylfluoranthenyl, methylnaphthacenyl, methylchrysenyl, and the like; and the dimethyl substituted fused polycyclic hydrocarbon groups such as dimethylindanyl, dimethylindenyl, dimethylnaphthyl, dimethylfluorenyl, dimethylphenalenyl, dimethylphenanthrenyl, dimethylacenaphthenyl, dimethyltriphenylenyl, dimethylpyrenyl, dimethylanthryl, dimethylfluoranthenyl, dimethylnaphthacenyl, dimethylchrysenyl, and the like.

$R_2$ in structural Formulas I and II is hydrogen, or an alkyl group containing from one to twelve carbon atoms, inclusive and preferably containing from one to 6 carbon atoms inclusive.

Illustrative of such alkyl groups are the alkyl groups such as methyl, ethyl, n-propyl, isopropyl, 1-butyl, 2-butyl, tert-butyl, isobutyl, 1-pentyl, 2-pentyl, 3-pentyl, 2-methyl-1-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-ethyl-1-butyl, 1-heptyl, 2-heptyl, 3-heptyl, 4-heptyl, 2-methyl-1-hexyl, 3-methyl-1-hexyl, 4-methyl-1-hexyl, 5-methyl-1-hexyl, 2-ethyl-1-pentyl, 3-ethyl-1-pentyl, 3-ethyl-3-pentyl, 1-octyl, 2-octyl, 3-octyl, 4-octyl, 2-methyl-1-heptyl, 3-methyl-1-heptyl, 4-methyl-1-heptyl, 5-methyl-1-heptyl, 6-methyl-1-heptyl, 2-ethyl-1-hexyl, 3-ethyl-1-hexyl, 4-ethyl-1-hexyl, 2-propyl-1-pentyl, 1-nonyl, 2-nonyl, 3-nonyl, 4-nonyl, 5-nonyl, 2-methyl-1-octyl, 3-methyl-1-octyl, 4-methyl-1-octyl, 5-methyl-1-octyl, 6-methyl-1-octyl, 7-methyl-1-octyl, 2-ethyl-1-heptyl, 3-ethyl-1-heptyl, 4-ethyl-1-heptyl, 5-ethyl-1-heptyl, 2-propyl-1-hexyl, 3-propyl-1-hexyl, 2,2-diethyl-1-pentyl, 3,3-diethyl-1-pentyl, 3,5-dimethyl-4-heptyl, 1-decyl, 2-decyl, 3-decyl, 4-decyl, 5-decyl, 2-methyl-1-nonyl, 3-methyl-1-nonyl, 4-methyl-1-nonyl, 5-methyl-1-nonyl, 6-methyl-1-nonyl, 7-methyl-1-nonyl, 8-methyl-1-nonyl, 2-ethyl-1-octyl, 3-ethyl-1-octyl, 4-ethyl-1-octyl, 5-ethyl-1-octyl, 6-ethyl-1-octyl, 2-propyl-1-heptyl, 3-propyl-1-heptyl, 4-propyl-1-heptyl, 2-butyl-1-hexyl, 1-undecyl, 2-undecyl, 3-undecyl, 4-undecyl, 5-undecyl, 6-undecyl, 2-methyl-1-decyl, 3-methyl-1-decyl, 4-methyl-1-decyl, 5-methyl-1-decyl, 6-methyl-1-decyl, 7-methyl-1-decyl, 8-methyl-1-decyl, 9-methyl-1-decyl, 2-ethyl-1-nonyl, 3-ethyl-1-nonyl, 4-ethyl-1-nonyl, 5-ethyl-1-nonyl, 6-ethyl-1-nonyl, 7-ethyl-1-nonyl, 8-ethyl-1-nonyl, 2-propyl-1-octyl, 3-propyl-1-octyl, 4-propyl-1-octyl, 5-propyl-1-octyl, 6-propyl-1-octyl, 2-butyl-1-heptyl, 3-butyl-1-heptyl, 2-penytl-1-hexyl, 1-dodecyl, 2-dodecyl, 3-dodecyl, 4-dodecyl, 5-dodecyl, 6-dodecyl, and the like; β-position monohydroxy substituted alkyl groups containing from 2 to 12 carbon atoms inclusive such as β-hydroxyethyl, β-hydroxypropyl, β-hydroxy-β-methylethyl, β-hydroxybutyl, β-hydroxypentyl, β-hydroxy-β-methylbutyl, β-hydroxyhexyl, β-hydroxy-β-methylpentyl, β-hydroxyheptyl, β-hydroxy-β-methylhexyl, β-hydroxy-β-ethylpentyl, β-hydroxyoctyl, β-hydroxynonyl, β-hydroxydecyl, β-hydroxyundecyl, β-hydroxydodecyl and the like; and aminosubstituted alkyl groups containing from one to twelve carbon atoms inclusive and in which the amino group has the formula:

wherein: $R_3$ and $R_4$ are hydrogen or lower alkyl groups containing from one to four carbon atoms inclusive and can be the same or different.

Illustrative of these amino substituted alkyl groups are aminomethyl,
1-aminoethyl,
2-aminoethyl,
1-aminopropyl,
2-aminopropyl,
3-aminopropyl,
1-aminobutyl,
2-aminobutyl,
3-aminobutyl,
4-aminobutyl,
1-aminopentyl,
2-aminopentyl,
3-aminopentyl,
4-aminopentyl,
5-aminopentyl,
1-aminohexyl,
2-aminohexyl,
3-aminohexyl,
4-aminohexyl,
5-aminohexyl,
6-aminohexyl,
7-aminoheptyl,
8-aminooctyl,
9-aminononyl,
10-aminodecyl,
11-aminoundecyl,
12-aminododecyl,
N-methylaminomethyl,
N-methylaminoethyl,
N-methylaminopropyl,
N-methylaminobutyl,
N-methylaminopentyl,
N-methylaminohexyl,
N-methylaminodecyl,
N-ethylaminomethyl,
N-ethylaminoethyl,
N-ethylaminopropyl,
N-ethylaminobutyl,
N-ethylaminopentyl,
N-ethylaminohexyl,
N-ethylaminodecyl,
N-propylaminomethyl,
N-propylaminoethyl,
N-propylaminopropyl,
N-propylaminobutyl,
N-propylaminopentyl,
N-propylaminohexyl,
N-propylaminodecyl,
N,N-dimethylaminomethyl,
N,N-dimethylaminoethyl,
N,N-dimethylaminopropyl,
N,N-dimethylaminohexyl,
N,N-dimethylaminododecyl,
N-methyl-N-ethylaminomethyl,
N-methyl-N-ethylaminoethyl,
N-ethyl-N-methylaminopropyl,
N-methyl-N-ethylaminohexyl,
N-methyl-N-ethylaminodecyl,
N,N-diethylaminomethyl,
N,N-diethylaminoethyl,
N,N-diethylaminopropyl,
N,N-diethylaminobutyl,
N,N-diethylaminopentyl,
N,N-diethylaminohexyl,
N,N-diethylaminoheptyl,
N,N-dipropylaminomethyl,
N,N-dipropylaminoethyl,
N,N-dipropylaminopropyl,
N,N-dipropylaminopentyl,
N,N-dipropylaminohexyl,
N-methyl-N-propylaminomethyl,
N-methyl-N-propylaminoethyl,
N-methyl-N-propylaminobutyl,
N-methyl-N-propylaminopentyl,
N-ethyl-N-propylaminomethyl,
N-ethyl-N-propylaminoethyl,
N-ethyl-N-propylaminopropyl,
N-ethyl-N-propylaminobutyl,
N-ethyl-N-propylaminopentyl,
N-ethyl-N-propylaminohexyl, and the like.

In structural Formula II, HA is a monobasic or polybasic organic acid or a monobasic or polybasic inorganic acid, and $n$ is an integer having a value of from 1 to 2 inclusive. Whenever $R_2$ is an amino alkyl group, as described, then $n$ can be 2, otherwise, $n$ is 1.

Illustrative of organic acids which can be reacted with 2-(polycarbocyclicmethylmercapto)imidazoline to form salts thereof are the carbocyclic acids; such as the fatty acids having the formula:

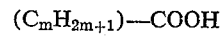

wherein: $m$ is an integer having a value of 0 to 20 inclusive, exemplary of which are formic acid, acetic acid, propionic acid, butyric acid, capric acid, caproic acid, lauric acid, palmitic acid, stearic acid and the like; the monobasic unsaturated acids such as those having the formula:

$$(C_aH_{2a-1})—COOH$$

wherein: $a$ is an integer having a value of from 2 to 20 inclusive, such as acrylic acid, crotonic acid, isocrotonic acid, vinylacetic acid, methacrylic acid, tiglic acid, angelic acid, senecioic acid, oleic acid, elaidic acid, brassidic acid and the like; aromatic acids, exemplified by benzoic acid, phenylacetic acid, toluic acid, β-phenylpropionic acid, ethylbenzoic acid, mesitylic acid, xylic acid, trimethylbenzoic acid and the like; dibasic acids such as those having the formula:

$$HOOC—(CH_2)_x—COOH$$

wherein: $x$ is an integer having a value of from 0 to 20 inclusive, exemplary of which are oxalic acid, malonic acid, succinic acid, glutaric acid, adipic acid, pimelic acid, suberic acid, azelic acid, brassic acid, brassylic acid and the like; dibasic unsaturated acids, such as those having the formula:

$$HOOC—(C_zH_{2z-2})—COOH$$

wherein: $z$ is an integer having a value of from 2 to 20 inclusive, exemplary of which are fumaric acid, maleic acid, glutaconic acid, citraconic acid, itaconic acid, mesaconic acid, allylmalonic acid, propylidenemalonic acid, hydromuconic acid and the like; and the aromatic dibasic acids, such as phthalic acid, uvitic acid, xylidinic acid and the like; and the polybasic acids such as pyromillitic acid, benzenepentacarboxylic acid, millitic acid and the like.

Also suitable for purposes of this invention are the non-carboxylic acids such as the organosulfonic acids, represented by methanesulfonic acid, ethanesulfonic acid, propanesulfonic acid, benzenesulfonic acid, naphthalenesulfonic acid, ethylene disulfonic acid and the like; the organo-sulfinic acids, represented by methanesulfinic acid, ethanesulfinic acid, benzenesulfinic acid and the like; the organophosphorus containing acids, represented by methylphosphinic acid, ethylphosphinic acid, phenylphosphinic acid, methylphosphonic acid, ethylphosphonic acid, penylphosphonic, methylphosphinous acid, ethylphosphinous acid, phenylphosphinous acid, methylphosphonous acid, ethylphosphonous acid, phenylphosphonous acid and the like.

Illustrative of suitable inorganic acids for purposes of this invention are the strong mineral acids such as hydroiodic acid, hydrobromic acid, hydrochloric acid, hydrofluoric acid, sulfuric acid, phosphoric acid, orthophosphorous acid and the like; the weak mineral acids such as arsenic acid, arsenous acid, boric acids, molybdic acid, selenic acids, selenous acids, telluric acids, tellurous acids, titanic acid, tungstic acid, and the like; and the inorganic oxidizing acids such as bromic acid, bromous acid, chloric acid, chlorous acid, chromic acid, chromous acids, hypochloric acid, iodic acid, iodus acid, nitric acid, periodic acid, perbromic acid, perchloric acid, and the like;

The 2 - (polycarbocyclicmethylmercapto)imidazolines of this invention can be conveniently prepared by reacting a halomethylated fused polycarbocyclic compound having the formula:

$$R_1CH_2X$$

wherein: $R_1$ is as previously defined and X is a halogen atom having an atomic number greater than 9 i.e., chlorine, bromine and iodine with a 2-mercaptoimidazoline having the formula:

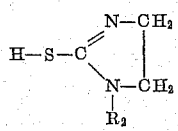

wherein: $R_2$ is as previously defined, to form the corresponding 2 - (polycarbocyclicmethylmercapto)imidazoline hydrogen halide salt and the hydrogen halide salt then reacted with a base to form the corresponding 2-(polycarbocyclicmethylmercapto)imidazoline.

The reaction between a halomethylated fused polycarbocyclic compound and a 2-mercaptoimidazoline to form the corresponding 2 - (polycarbocyclicmethylmercapto)imidazoline hydrogen halide salt can be represented by the following equations:

Equation I

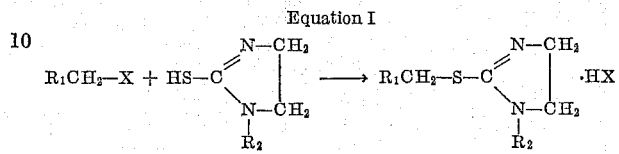

wherein: $R_1$ and $R_2$ are as previously defined.

The reaction of the hydrogen halide salt with a base to form the corresponding 2 - (polycarbocyclicmethylmercapto)imidazoline can be represented by the following equation wherein the base is an alkali metal hydroxide, or an alkaline earth metal hydroxide.

Equation II

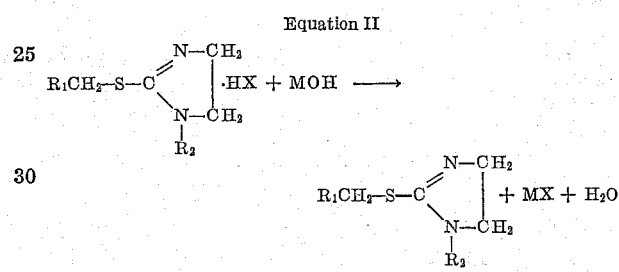

In producing a 2 - (polycarbocyclicmethylmercapto)imidazoline hydrogen halide salt by reacting a halomethylated fused polycarbocyclic compound with a 2-mercaptoimidazoline, various amounts of the reactants can be used. Generally admixing from about 1 to about 2 moles of the 2-mercaptoimidazoline per mole of the halomethylated fused polycarbocyclic compound results in the production of the corresponding 2 - (polycarbocyclicmethylmercapto)imidazoline hydrogen halide salt in satisfactory yields. If desired more than about 2 moles of the 2-mercaptoimidazoline per mole of the halomethylated fused polycarbocyclic compound can be used by this does not materially increase the yield of the corresponding condensed compound and is therefore economically undesirable. It is generally preferred to use equimolar amounts of these reactants.

The temperature at which the reaction between the halomethylated fused polycarbocyclic compound and the 2-mercaptoimidazoline is conducted is not critical. As a rule temperatures in the range of about 50° centigrade to reflux, which is generally on the order of about 200° centigrade, are satisfactory. At a temperature lower than about 50° centigrade, the reaction proceeds sluggishly. The preferred temperature for this reaction is in the range of about 70° centigrade to about 90° centigrade.

It is preferred to conduct the reaction between a halomethylated fused polycarbocyclic compound and a 2-mercaptoimidazoline in a reaction medium containing an organic diluent which is a solvent for the reactants, a non-solvent for the hydrogen halide salt which is formed and which is non-reactive with respect to the starting materials and the final product. The use of an organic diluent facilitates removal of the final product from the reacted mixture.

The actual organic diluent used will depend upon the starting materials and the temperature at which the reaction is to be conducted. The organic diluent should have a boiling point at or above the reaction temperature. It is customary to use the organic diluent in amounts of at least about 50 percent by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to about 500 percent by weight base on the weight of the starting materials.

Suitable organic diluents include, among others; the saturated alcohols such as methanol, ethanol, propanol and the like; glycols such as ethylene glycol, propylene glycol, glycerine and the like; ketones such as acetone, methylethylketone, methylisobutyl ketone and the like; and amides such as dimethylformamide and the like.

The reaction between a halomethylated fused polycarbocyclic compound and a 2-mercaptoimidazoline is conducted, generally, under atmospheric pressure, although, if desired, the reaction can be conducted under subatmospheric or superatmospheric pressure.

Completion of the reaction is indicated by cessation of any further precipitation of the product. The actual reaction time will depend in part upon the particular reactants employed as well as the temperature at which the reaction is conducted.

Recovery of the 2-(polycarbocyclicmethylmercapto)-imidazoline hydrogen halide salt product can be accomplished by any one of a variety of convenient methods, as for example by recovering the product as a filter cake or by vacuum distilling the reacted mixture and recovering the product as the residue.

If desired, the product can be washed with an ether such as diethyl ether, dioxane, and the like, or liquid hydrocarbons such as benzene, toluene, hexane and the like.

2-(polycarbocyclicmethylmercapto)imidazolines coming within the purview of Formula I can be prepared by reacting a 2-(polycarbocyclicmethylmercapto)imidazoline hydrogen halide salt, produced by reacting a halomethylated fused polycarbocycle compound with a 2-mercaptoimidazoline as described, with a base whereby the base splits off the hydrogen halide yielding the 2-(polycarbocyclicmethylmercapto)imidazoline. This reaction is exemplified by Equation II previously noted.

Illustrative of suitable bases are the alkali metal hydroxides as for example sodium hydroxide, potassium hydroxide, lithium hydroxide and the like; alkaline earth metal hydroxides such as calcium hydroxide, barium hydroxide, magnesium hydroxide and the like.

Suitable bases also include the carbonates of the alkali metals such as sodium carbonate, lithium carbonate, and potassium carbonate, and the carbonates of the alkaline earth metals such as calcium carbonate, magnesium carbonate and the like.

Various amounts of base can be reacted with a 2-(polycarbocyclicmethylmercapto)imidazoline hydrogen halide salt to produce the 2-(polycarbocyclicmethylmercapto) imidazolines of this invention. Generally the amount of base used will vary from about 1 to about 2 moles per mole of hydrogen halide salt. More than 2 moles of base per mole of the hydrogen halide salt can be used, if so desired, but this is economically undesirable as the yield of 2-(polycarbocyclicmethylmercapto)imidazoline is not materially increased. It is preferred to use equimolar amounts of reactants.

The temperature at which the reaction between a base and a hydrogen halide salt is conducted is not critical. Suitable temperatures range from about 0° centigrade to about 100° centigrade. At temperatures below about 0° centigrade the reaction proceeds sluggishly. A temperature in the range of from about 20° centigrade to about 30° centigrade is most preferred.

It is also preferred to conduct the reaction between the hydrogen halide salt and a suitable base in a reaction medium containing water. The reaction between the hydrogen halide salt and a base is exothermic. The presence of water serves to dissipate the heat of reaction and in addition, facilitates removal of the 2-(polycarbocyclicmethylmercapto)imidazoline from the reacted mixture.

If desired, the reaction can be conducted under atmospheric, subatmospheric or superatmospheric pressures. For obvious reasons, atmospheric pressure is preferred.

The process by which the 2-(polycarbocyclicmethylmercapto)imidazolines of this invention are produced can be conducted by simply admixing the hydrogen halide salt and a base at the desired temperature. The reaction is practically instantaneous in that some of the desired product is formed immediately upon mixing of the reactants. Usually, however, the reaction mixture is allowed to stand for at least two hours in order to insure that the reaction has proceded to completion. The completion of the reaction is evidenced generally by a pH determination. When the pH of the reaction mixture rises to a point in excess of 7, the reaction has reached completion.

Recovery of the 2-(polycarbocyclicmethylmercapto)-imidazolines from the reacted mixture can be conveniently accomplished by vacuum distilling off the water and recovering the solid residue which is the desired product or by recovering the product as a filter cake.

Acid salts of 2-(polycarbocyclicmethylmercapto)imidazolines can be prepared by reacting the desired 2-(polycarbocyclicmethylmercapto)imidazoline with a desired acid.

The reaction between a 2-(polycarbocyclicmethylmercapto)imidazoline and an acid is generally conducted by admixing the desired reactants in amounts of from about 1 mole to about 2 moles of acid per mole of 2-(polycarbocyclicmethylmercapto)imidazoline. More than 2 moles of acid can be used but this is economically undesirable. It is preferred to use equimolar amounts. As a rule it is desirable to use aqueous solutions of the acids of about one percent to about 40 percent concentration in order to best control the rate of reaction.

It is also desirable to conduct the reaction between a 2-(polycarbocyclicmethylmercapto)imidazoline and an acid in a reaction medium containing an organic diluent. Suitable organic diluents, suitable amounts thereof, and recovery techniques for isolating the product are the same as those previously described as suitable for conducting the reaction between a halomethylated fused polycarbocyclic compound and a 2-mercaptoimidazoline.

As an alternative method of preparing a hydrogen halide salt of 2-polycarbocyclicmethylmercapto)imidazoline, a halomethylated fused polycarbocyclic compound can be reacted with 2-mercaptoimidazoline in a manner as previously described.

Halomethylated fused polycarbocyclic compounds having the formula:

can be conveniently prepared as described in Example 1A of this application.

Preparation of 2-mercaptoimidazolines having the formula:

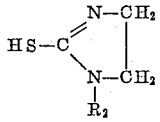

is described in Example 1B of this application.

To facilitate the distribution of the fungicidal compounds disclosed herein, they are preferably applied in conjunction with a diluent or extender. The extender may be either a liquid (usually, and preferably, water) or a powdered solid. For application as dusting compositions the compounds may be so admixed with finely divided solid inert materials as to provide homogeneous free-flowing dusts. The usual pulverized inert materials may be used, preferably talcs, natural clays, pyrophollite, diatomaceous earth or cotton seed flour or other flours. Other inert solid carriers may be magnesium or calcium carbonates, calcium phosphate, etc., either in powder or granular form. The percent by weight of the essential active ingredient will vary according to the manner in which the composition is to be applied but, in general, will be from about 0.5 to 95 percent by weight of the dust. The preferred percentage range of the active essential ingredient is from 25 to 75 percent by weight based upon the total weight of the dusting composition. The inert carriers may be substituted in whole or in part by other materials which it is desired to apply to the soil, for instance fertilizers, soil conditioners, and the like.

Liquid fungicidal compositions are preferably applied with water as the extender, the amount of water depending principally upon the convenience of the agriculturist and the type of spraying apparatus which he customarily uses. Sprays which are toxic to fungi can contain from 0.1 to 95 percent by weight of the active essential ingredient based upon the total weight of the spray and preferably contain from 25 to 85 percent by weight of the active essential ingredient based upon the total weight of the spray.

In the case of aqueous sprays it is desired to have the fungicidal compound in homogeneous dispersion and for this purpose a surface-active agent is preferably used. Substantially any wetting, dispersing or penetrating agent may be used whether anionic, cationic or nonionic. The preferred concentrates contain the fungicidal compound with from about 0.1 percent to 15 percent by weight of surface-active agent with a sufficient amount of the fungicidal compound to make 100 parts by weight, such compositions then being suitable for admixture with either a solid or a fluid extender. For general use, the weight of surface-active agent will be from about 5 percent to 10 percent of the weight of the active ingredient in the concentrate. Suitable surface-active, wetting or dispersing agents may be, for example, sodium and potassium oleates, the amine salts of oleic acid such as morpholine and dimethylamine oleates, the sulfonated animal and vegetable oils such as sulfonated fish oil and castor oil, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, gylcerol monostearate, digylcol oleate, polyethylene oxides, ethylene oxide condensation products with stearyl alcohol and octylphenol, polyvinyl alcohols, salts, such as the acetate of polyamines from reductive amination of ethylene carbon monoxide polymers, laurylamine, hydrochloride, laurylpyridinium bromide, stearyltrimethylammonium bromide, cetyldimethylbenzyl ammonium chloride, lauryldimethylamine oxide, and the like.

The compounds contemplated herein may be used with or without "addends," for instance insecticides, such as rotenone, D.D.T. or nicotine sulfate, or those addends which cause the fungicides to adhere evenly and strongly to plant foliage, such as methyl cellulose, extending materials or diluents, such as the inert materials previously mentioned, which facilitate the measuring of and the application of the small amounts of active materials which are desirable to inhibit the fungi. Addends such as bentonite are combined extenders and adhesives.

Tests were performed in order to evaluate the fungicidal activity of the compounds of the present invention. The following compounds were evaluated:

Compound #1—2-(3-fluoranthenylmethylmercapto)imidazoline.
Compound #2—The phosphoric acid salt of Compound #1.
Compound #3—The nitric acid salt of Compound #1.
Compound #4—The sulfuric acid salt of Compound #1.
Compound #5—The acetic acid salt of Compound #1.
Compound #6—The hydrochloric acid salt of Compound #1.
Compound #7—The hydrochloric acid salt of 1-(2-hydroxyethyl)-2-(3-fluoranthenylmethylmercapto)imidazoline.
Compound #8—The hydrochloric acid salt of 2-(9-anthacenylmethylmercapto)imidazoline.
Compound #9—2-(9-phenathrenylmethylmercpto)imidazoline.
Compound #10—The hydrochloric acid salt of Compound #9.
Compound #11—2-(1-pyrenylmethylmercapto)imidazoline·hydrochloride.
Compound #12—The hydrochloric acid salt of 2-(2-naphthylmethylmercapto)imidazoline.

BIOLOGICAL TESTS PERFORMED

*Tomato foliage disease tests.*—Greenhouse tests were performed using the compounds of this invention for control of early blight of tomatoes caused by the fungus *Alternaria solani*.

Aqueous suspensions of the test compounds were prepared and 1 individual tomato plant was sprayed for 30 seconds with each aqueous suspension. As soon as the spray on each plant dried, the plant was then inoculated with an aqueous suspension of *Alternaria solani* spores. All plants were then maintained for 24 hours in a chamber wherein the temperature was 25° centigrade and the relative humidity was 100 percent. The plants were then removed from the chamber and the efficacy of the test compounds determined as subsequently described.

In the same manner as described in the preceding sentence, 6 control plants, that is plant which were not sprayed with any fungicide were inoculated with *Alternaria solani* spores and placed in a chamber wherein the temperature was at 25° centigrade and the relative humidity was 100 percent.

Ratings as the efficacy of the test compounds were made by use of the equation $$E = \frac{L_C - C_T}{L_C} \times 100$$

wherein:
$E$ = Efficiency of the test compound in percent.
$L_C$ = Average number of lesions per control plant.
$L_T$ = Average number of lesions per plant sprayed with test compound.

| Compound | Amount of Compound in Each Test Solution | |
|---|---|---|
| | 0.04 part by weight | 0.008 part by weight |
| | Efficiency in Percent | |
| 1 | 100 | 87 |
| 2 | 76 | 88 |
| 3 | 94 | 64 |
| 4 | 100 | 70 |
| 5 | 100 | 90 |
| 6 | 100 | |
| 7 | 80 | 60 |
| 8 | 100 | 82 |
| 9 | 97 | 100 |
| 10 | 80 | 60 |
| 11 | | 85 |

*Bean mildew tests.*—Greenhouse tests were conducted using compounds of this invention for control of powdery mildew of beans caused by the fungus *Erysiphe polygoni*.

Aqueous suspensions of the test compounds were prepared and individual bean plants of about 10 days of age, that had been inoculated two to four days previously by dusting with spores of the fungus *Erysiphe polygoni*, were sprayed for 30 seconds with each aqueous suspension of the desired test compound. The plants were then placed in a greenhouse and after 10 days to 2 weeks were examined for mildew. Similarly 6 control plants which had not been treated with the test compounds were otherwise treated in an identical manner. At the end of the test period the control plants showed 75 to 100 percent of leaf surface covered with mildew. The efficacy of the test compounds was determined by the use of the equation disclosed in the tomato foliage disease tests shown above. The excellent fungicidal activity of the compounds of this invention is noted in the table which follows:

| Compound | Amount of Compound in Each Test Solution | | |
|---|---|---|---|
|  | 0.04 part by weight | 0.008 part by weight | 0.0016 part by weight |
|  | Efficiency in Percent | | |
| 1 | 100 | 95 |  |
| 2 | 100 | 100 |  |
| 3 | 100 | 95 |  |
| 4 | 100 | 100 | 100 |
| 5 | 100 |  |  |
| 6 | 100 | 100 | 95 |
| 7 | 100 |  |  |
| 8 | 100 | 100 |  |
| 10 | 100 | 95 |  |
| 11 | 100 | 100 |  |

*Example 1*

A—PREPARATION OF 3-CHLOROMETHYL-FLUORANTHENE

Reactants:
  Fluoranthene
  Paraformaldehyde
  Hydrochloric Acid

A stream of anhydrous hydrogen chloride was passed into a mixture of 202 parts by weight of fluoranthene, 36 parts by weight of paraformaldehyde, 200 parts by weight of concentrated hydrochloric acid (36%), 120 parts by weight of 85 percent phosphoric acid and 240 parts by weight of acetic acid over a period of 7 hours at a rate such that the hydrogen chloride was evolved from the reaction mixture. During this 7 hour period the temperature of the reaction mixture was maintained at from 70° centigrade to 80° centigrade. At the end of the seven hour period the reaction mixture was cooled to room temperature about 23° centigrade, the liquid decanted from the solid residue, and the solid residue washed three times with about 500 milliliter portions of water. The solid product obtained was then recrystallized from benzene.

The yield of 3-chloromethylfluoranthene was 92.1 percent based upon the weight of fluoranthene charged. The product had the following physical properties:

Physical state at 25°—gray solid.
Melting point—125° centigrade.

B—PREPARATION OF 2-MERCAPTOIMIDAZOLINE

Reactants:
  Ethylene diamine
  Carbon disulfide 76 parts by weight of carbon disulfide were added to a mixture of 70.5 parts by weight of 85.6 percent ethylene diamine and 290 parts by weight water. During this addition the reaction mixture was agitated and the temperature thereof was held maintained at 30° to 35° centigrade. When the addition had been completed the reaction mixture was heated to a temperature of from 90°–100° centigrade until the evolution of hydrogen sulfide ceased. The reacted mixture was then cooled to 10° centigrade. The product which precipitated out was recovered as a filter cake, washed with about 200 milliliters of cold water, and dried by heating at 40° centigrade for about 8 hours.

The yield of 2-mercaptoimidazoline was 95 percent based upon the weight of the ethylenediamine charged. The product had the following physical properties:

Physical state at 25° centigrade—white crystalline solid.
Melting point (range)—190°–200° centigrade.

C—PREPARATION OF 2-(3-FLUORANTHENYLMETHYL-MERCAPTO)IMIDAZOLINE · HYDROCHLORIDE

Reactants:
  3-chloromethylfluoranthene
  2-mercaptoimidazoline 250 parts by weight (1 mole) of 3-chloromethylfluoranthene and 102 parts by weight (1 mole) of 2-mercaptoimidazoline were dissolved in 1500 parts by weight of ethanol. The solution was then heated to reflux about 80° centigrade and refluxed for a period of five hours while being continuously strried. During this period of reflux, the product precipitated slowly. The reacted mixture was then cooled to room temperature, about 25° centigrade, and 1.5 liters of diethyl ether added thereto. The product was then recovered by vacuum filtration, washed with two 500 milliliter portions of diethyl ether and air dried at a temperature of from 20°–25° C. for a period of about 18 hours.

The yield of 2-(3-fluoranthenylmethylmercapto)imidazoline hydrochloride was 98.5 percent based upon the weight of the 3-chloromethylfluoranthene charged. The product had the following physical properties:

Physical state at 25° C.— gray solid.
Melting point—219° centigrade.
Nitrogen content, percent by weight:
  Found—7.11
  Calculated—7.9
Carbon content, percent by weight:
  Found—68.07
  Calculated—67.7
Hydrogen content, percent by weight:
  Found—4.63
  Calculated—4.8
Sulfur content, percent by weight:
  Found—10.42
  Calculated—10.00

*Example 2*

PREPARATION OF 2-(3-FLUORANTHENYLMETHYL-MERCAPTO)IMIDAZOLINE

Reactants:
  2 - (3-fluoranthenylmethylmercapto)imidazoline·hydrochloride
  Sodium hydroxide A solution of 39.2 parts by weight (0.98 mole) of sodium hydroxide in 200 parts by weight water was added to a slurry of 345 parts by weight (0.98 mole) of 2-(3-fluoranthenylmethylmercapto)imidazoline · hydrochloride in 2 liters of water. The reaction mixture was stirred for a period of 2 hours during which period the temperature of the reactants was maintained at 25° centigrade. The product was isolated by vacuum filtration, and air dried by allowing it to stand at room temperature, about 25° centigrade for about 24 hours.

The yield of 2-(3-fluoranthenylmethylmercapto)imidazoline was 97.5 percent based upon the weight of the 2-(3-fluoranthenylmethylmercapto)imidazoline · hydrochloride charged. The product had the following physical properties:

Physical state at 25° C.—light-tan solid.
Melting point—119° centigrade.
Nitrogen content—percent by weight:
  Found—8.59
  Calculated—8.87

*Example 3*

PREPARATION OF 2-(3-FLUORANTHENYLMETHYL-MERCAPTO)IMIDAZOLINE · ACETATE

Reactants:
  2-(3-fluoranthenylmethylmercapto)imidazoline
  Acetic acid 63 parts by weight (0.2 mole) of 2-(3-fluoranthenyl-methylmercapto)imidazoline were admixed with 12 parts by weight (0.2 mole) of acetic acid in 300 parts by weight of ethanol. This mixture was stirred for a period of 24 hours during which the temperature of the reaction mixture was maintained at 25° centigrade. At the end of this period the reacted mixture was diluted with an equal portion of diethyl ether, the product isolated by vacuum filtration and washed with two 100 milliliter portions of diethyl ether and dried in a manner described in Example 2.

The yield of 2-(3-fluoranthenylmethylmercapto)imidazoline·acetate was 56 percent based upon the weight of the 2 - (3 - fluoranthenylmethylmercapto)imidazoline charged. The product had the following physical properties:

Physical state at 25° C.—light gray solid.
Melting point (range)—205°–209° centigrade.
Nitrogen content, percent by weight:
    Found—7.56
    Calculated—7.45
Carbon content, percent by weight:
    Found—70.31
    Calculated—70.25
Hydrogen content, percent by weight:
    Found—5.04
    Calculated—5.32
Sulfur content, percent by weight:
    Found—8.84
    Calculated—8.52

*Example 4*

PREPARATION OF 2-(3-FLUORANTHENYLMETHYL-MERCAPTO)IMIDAZOLINE · NITRATE

Reactants:
    2-(3-fluoranthenylmethylmercapto)imidazoline
    Nitric acid 63 parts by weight (0.2 mole) of 2-(3-fluoranthenylmethylmercapto)imidazoline and 18 parts by weight (0.2 mole) of 70 percent nitric acid were admixed in 500 parts by weight of ethanol, and the mixture stirred for a period of 24 hours. During this time the temperature of the reaction mixture was maintained at 25° centigrade. At the end of this period the reacted mixture was diluted with 400 parts by weight of diethyl ether and the product isolated by vacuum filtration. The product was then washed with two 100 milliliter portions of diethyl ether and air dried in a manner described in Example 2.

The yield of 2-(3-fluoranthenylmethylmercapto)imidazoline·nitrate was 85 percent based upon the weight of the 2 - (3 - fluoranthenylmethylmercapto)imidazoline charged. The product had the following physical properties:

Physical state at 25° C.—light gray solid.
Melting point—171° centigrade.
Carbon content, percent by weight:
    Found—63.43
    Calculated—63.3
Hydrogen content, percent by weight:
    Found—4.72
    Calculated—4.48
Sulfur content, percent by weight:
    Found—8.44
    Calculated—8.44

*Example 5*

PREPARATION OF 2-(3-FLUORANTHENYLMETHYL-MERCAPTO)IMIDAZOLINE · SULFATE

Reactants:
    2-(3-fluorantheylmethylmercapto)imidazoline
    Sulfuric acid 63 parts by weight (0.2 mole) of 2-(3-fluoranthenyl-methylmercapto)imidazoline were admixed with 10.2 parts by weight (0.1 mole) of 96 percent sulfuric acid in 700 parts by weight of ethanol. The mixture was stirred for a period of 24 hours while maintained at a temperature of 25° centigrade. At the end of this period, the product was isolated by vacuum filtration, washed with two 100 milliliter portions of diethyl ether and air dried in a manner described in Example 2.

The yield of 2-(3-fluoranthenylmethylmercapto)imidazoline· sulfate was 88 percent based upon the weight of the 2 - (3 - fluoranthenylmethylmercapto)imidazoline charged.

The product had the following physical properties:

Physical state at 25° C.—light gray solid.
Melting point—153° centigrade.
Sulfur content, percent by weight:
    Found—14.99
    Calculated—13.16

*Example 6*

PREPARATION OF 2-(3-FLUORANTHENYLMETHYL-MERCAPTO)IMIDAZOLINE · PHOSPHATE

Reactants:
    2-(3-fluoranthenylmethylmercapto)imidazoline
    Phosphoric acid 63 parts by weight (0.2 mole) of 2-(3-fluoranthenyl-methylmercapto)imidazoline were admixed with 7.6 parts by weight (0.066 mole) of 85 percent phosphoric acid in 700 parts by weight ethanol. The reaction mixture was stirred for a period of 24 hours during which time the temperature thereof was maintained at 25° centigrade. At the end of this period, the product was isolated by vacuum filtration, washed with two 100 milliliter portions of diethyl ether and air dried in a manner described in Example 2.

The yield of 2-(3-fluoranthenylmethylmercapto)imidazoline· phosphate was 98 percent based upon the weight of the 2 - (3 - fluoranthenylmethylmercapto)imidazoline charged. The product had the following physical properties:

Physical state at 25° C.—gray solid.
Melting point (range)—170°–180° centigrade.

*Example 7*

PREPARATION OF 2-(2-NAPHTHYLMETHYLMER-CAPTO)IMIDAZOLINE · HYDROCHLORIDE

Reactants:
    2-chloromethylnaphthalene
    2-mercaptoimidazoline 17.6 parts by weight (0.1 mole) of 2-chloromethyl-naphthalene and 10.2 parts by wight (0.1 mole) of 2-mercapto-imidazoline were added to 200 parts by weight ethanol, the mixture heated to reflux, about 80° centigrade and maintained at reflux for 6 hours. After the six hour period the reacted mixture was cooled to room temperature, about 25° centigrade. 400 parts by weight diethyl ether were than added to the reacted mixture, in order to complete precipitation and the solid product therein isolated by vacuum filtration. The product was then washed with two 100 milliliter portions of diethyl ether and dried in a manner as described in Example 2.

The yield of 2-(2-naphthylmethylmercapto)imidazoline· hydrochloride was 99 percent based upon the weight of the 2-chloromethylnaphthalene charged. The product had the following physical properties.

Physical state at 25°—white, water soluble solid.
Melting point—200° centigrade.
Nitrogen content, percent by weight:
    Found—9.71
    Calculated—10.05

*Example 8*

PREPARATION OF 2-(9-ANTHRACENYLMETHYLMER-CAPTO)IMIDAZOLINE · HYDROCHLORIDE

Reactants:
9-chloromethylanthracene
2-mercaptoimidazoline

2 - (9-anthracenylmethylmercapto)imidazoline·hydrochloride was prepared in accordance with the method described in Example 1–C with the exception that 226 parts by weight (1 mole) of 9-chloromethylanthracene were used in place of 17.6 parts by weight of 3-chloromethylfluoranthene.

The yield of 2-(9-anthracenylmethylmercapto)imidazoline·hydrochloride was 87.5 percent based upon the weight of the 9-chloromethylanthracene charged. The product had the following physical properties:

Physical state at 25° centigrade—white solid.
Melting point (range)—168°–170° C.
Nitrogen content, percent by weight:
    Found—8.55
    Calculated—8.52

*Example 9*

PREPARATION OF 2-(9-PHENANTHRENYLMETHYLMERCAPTO)IMIDAZOLINE · HYDROCHLORIDE

Reactants:
9-chloromethylphenanthrene
2-mercaptoimidazoline

2 - (9 - phenanthrenylmethylmercapto)imidazoline·hydrochloride was prepared in accordance with the method described in Example 1–C with the exception that 226.5 parts by weight (1 mole) of 9-chloromethylphenanthrene were used in place of 17.6 parts by weight of 3-chloromethylfluoranthene.

The yield of 2-(9-phenanthrenylmethylmercapto)imidazoline·hydrochloride was 99 percent based upon the weight of the 9-chloromethylphenanthrene charged. The product had the following physical property.

Melting point—84°–88° centigrade.
Nitrogen content, percent by weight:
    Found—8.5
    Calculated—8.53

*Example 10*

PREPARATION OF 2-(3-PYRENYLMETHYLMERCAPTO)IMIDAZOLINE · HYDROCHLORIDE

Reactants:
1-chloromethylpyrene
2-mercaptoimidazoline

2 - (1-pyrenylmethylmercapto)imidazoline hydrochloride was prepared in accordance with the method described in Example 1–C with exception that 251 parts by weight (1 mole) of 1-chloromethylpyrene were used in place of 17.6 parts by weight of 3-chloromethylfluoranthene.

The yield of 2-(1-pyrenylmethylmercapto)imidazoline·hydrochloride was 98.5 percent based upon the weight of the 1-chloromethylpyrene charged. The product had the following physical property.

Melting point (range)—212°–216° centigrade.
Nitrogen content, percent by weight:
    Found—8.11
    Calculated—7.94

*Example 11*

PREPARATION OF 2-(9-PHENANTHRENYLMETHYLMERCAPTO)IMIDAZOLINE

Reactants:
2-(9-phenanthrenylmethylmercapto)imidazoline·hydrochloride
Sodium hydroxide 2 - (9-phenanthrenylmethylmercapto)imidazoline was prepared in accordance with the method described in Example 2 with the exception that 328.5 parts by weight (1 mole) of 2 - (9-phenanthrenylmethylmercapto)imidazoline·hydrochloride were used in place of the 345 parts by weight of 2-(3-fluoranthenylmethylmercapto)imidazoline·hydrochloride.

The yield of 2-(9-phenanthrenylmethylmercapto)imidazoline was 99.5 percent based upon the weight of the 2 - (9-phenanthrenylmethylmercapto)imidazoline·hydrochloride charged. The product had the following physical properties:

Physical state at 25° C.—brown solid.
Melting point (range)—62°–66° centigrade.
Nitrogen content, percent by weight:
    Found—8.83
    Calculated—9.6

*Example 12*

PREPARATION OF 2-(1-PYRENYLMETHYLMERCAPTO)IMIDAZOLINE

Reactants:
2-(1-pyrenylmethylmercapto)imidazoline·hydrochloride
Sodium hydroxide 2-(1-pyrenylmethylmercapto)imidazoline was prepared in accordance with the method described in Example 2 with the exception that 353 parts by weight (1 mole) of 2 - (1-pyrenylmethylmercapto)imidazoline·hydrochloride were used in place of 345 parts by weight of 2-(3-fluoranthenylmethylmercapto)imidazoline·hydrochloride.

The yield of 2-(1-pyrenylmethylmercapto)imidazoline was 99.5 percent based upon the weight of the 2-(1-pyrenylmethylmercapto)imidazoline·hydrochloride charged. The product had the following physical properties:

Physical state at 25° C.—white solid.
Melting point (range)—130°–135° centigrade.

*Example 13*

PREPARATION OF 1-(2-HYDROXYETHYL) - 2 - (3-FLUORANTHENYLMETHYLMERCAPTO)IMIDAZOLINE · HYDROCHLORIDE

Reactants:
3-chloromethylfluoranthene
1-(2-hydroxyethyl)-2-mercaptoimidazoline 1-(2-hydroxyethyl) - 2 - (3 - fluoranthenylmethylmercapto)imidazoline·hydrochloride was prepared in accordance with the method described in Example 1–C with the exception that 146 parts by weight (1 mole) of 1-(2-hydroxyethyl)-2-mercaptoimidazoline were used in place of the 102 parts by weight of 2-mercaptoimidazoline.

The yield of 1-(2-hydroxyethyl)-2-(3-fluoranthenylmethylmercapto)imidazoline·hydrochloride was 99 percent based upon the weight of 3 - chloromethylfluoranthene charged. The product had the following physical properties:

Physical state at 25° C.—brown solid.
Melting point—30° centigrade.
Nitrogen content, percent by weight:
    Found—6.72
    Calculated—7.06

We claim:

1. A compound selected from the group consisting of 2 - (polycarbocyclicmethylmercapto)imidazoline of the formula:

$$R_1-CH_2-S-C\begin{matrix}N-CH_2\\ \\ N-CH_2\\ | \\ R_2\end{matrix}$$

and the biologically active acid salts thereof, wherein $R_1$ is a member selected from the group consisting of unsubstituted fused polycarbocyclic, mono-hydroxy substituted fused polycarbocyclic, dihydroxy substituted fused polycarbocyclic, methyl substituted fused polycarbocyclic, and halo-substituted fused polycarbocyclic radicals, with the proviso that each of said polycarbocyclic radicals has from three to four rings inclusive with each of said rings having from four to seven carbon atoms inclusive and at least one of said rings is the benzene ring, and R₂ is a member selected from the group consisting of hydrogen, alkyl of from one to twelve carbon atoms inclusive, β-mono-hydroxyalkyl of from two to twelve carbon atoms inclusive, and amino-substituted alkyl of from one to twelve carbon atoms inclusive in which the amino moiety has the formula:

wherein R₃ and R₄ are members selected from the group consisting of hydrogen and alkyl of from one to four carbon atoms inclusive.

2. A 2-(polycarbocyclicmethylmercapto)imidazoline of the formula:

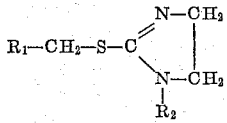

wherein R₁ is fused polycyclichydrocarbyl of from three to four rings inclusive with each of said rings having from four to seven carbon atoms inclusive and at least one of said rings being the benzene ring and R₂ is hydrogen.

3. A 2 - (polycarbocyclicmethylmercapto)imidazoline of the formula:

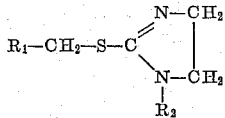

wherein R₁ is fused polycyclichydrocarbyl of from three to four rings inclusive with each of said rings having from four to seven carbon atoms inclusive and at least one of said rings being the benzene ring and R₂ is alkyl of from one to twelve carbon atoms inclusive.

4. A 2 - (polycarbocyclicmethylmercapto)imidazoline of the formula:

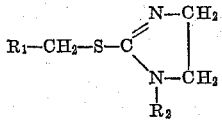

wherein R₁ is fused polycyclichydrocarbyl of from three to four rings inclusive with each of said rings having from four to seven carbon atoms inclusive and at least one of said rings being the benzene ring and R₂ is β-mono-hydroxyalkyl of from two to twelve carbon atoms inclusive.

5. A 2 - (polycarbocyclicmethylmercapto)imidazoline of the formula:

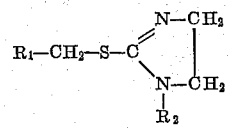

wherein R₁ is fused polycyclichydrocarbyl of from three to four rings inclusive with each of said rings having from four to seven carbon atoms inclusive and at least one of said rings being the benzene ring and R₂ is alkylaminoalkyl of from two to twelve carbon atoms inclusive.

6. A 2-(polycarbocyclicmethylmercapto)imidazoline of the formula:

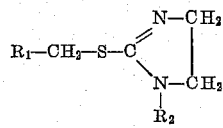

wherein R₁ is fused polycyclichydrocarbyl of from three to four rings inclusive with each of said rings having from four to seven carbon atoms inclusive and at least one of said rings being the benzene ring and R₂ is primary aminoalkyl of from one to twelve carbon atoms inclusive.

7. A compound as described in claim 2 wherein the fused polycyclichydrocarbyl radical is fluoranthenyl.

8. A compound as described in claim 2 wherein the fused polycyclichydrocarbyl is anthracenyl.

9. A compound as described in claim 2 wherein the fused polycyclichydrocarbyl radical is phenanthrenyl.

10. A compound as described in claim 2 wherein the fused polycyclichydrocarbyl radical is pyrenyl.

11. 2-(3-fluoranthenylmethylmercapto) - 2 - imidazoline·hydrochloride.

12. 1-(2-hydroxyethyl) - 2 - (3-fluoranthenylmethylmercapto)-2-imidazoline·hydrochloride.

13. 2-(9-anthracenylmethylmercapto) - 2 - imidazoline·hydrochloride.

14. 2 - (1 - pyrenylmethylmercapto) - 2 - imidazoline·hydrochloride.

15. 2-(9-phenanthrenylmethylmercapto) - 2 - imidazoline·hydrochloride.

References Cited by the Examiner
UNITED STATES PATENTS

| | | | |
|---|---|---|---|
| 2,680,745 | 6/54 | Craig et al. | 260—309.6 |
| 2,738,325 | 3/56 | Rydell | 252—8.55 |
| 2,888,379 | 5/59 | Bruning et al. | 260—309.6 |
| 2,940,927 | 6/60 | Hughes | 252—8.55 |
| 2,987,522 | 6/61 | Shen | 260—309.6 |
| 2,992,230 | 7/61 | Lecisin | 260—309.6 |

OTHER REFERENCES

Baer et al., Jour. Amer. Chem. Soc., vol. 76, pp. 1162–64 (1954).

Boyd et al., Anal. Chem., vol 32, pp. 551–56 (1960).

Fieser et al., Organic Chemistry, 2nd Ed. p. 564, Boston, Heath, 1950.

Hofmann, "Imidazole and Its Deriv.," pages 224–5 (1953), Interscience.

IRVING MARCUS, *Primary Examiner.*

DUVAL T. McCUTCHEN, WALTER A. MODANCE, *Examiners.*